United States Patent
Kinoshita et al.

(10) Patent No.: US 9,604,528 B2
(45) Date of Patent: Mar. 28, 2017

(54) CONTROL APPARATUS FOR HYBRID VEHICLE

(71) Applicant: TOYOTA JIDOSHA KABUSHIKI KAISHA, Toyota-shi, Aichi-ken (JP)

(72) Inventors: Gohki Kinoshita, Susono (JP); Yoshihito Kanno, Numazu (JP); Hiroki Morita, Hiratsuka (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/759,013

(22) PCT Filed: Jan. 24, 2013

(86) PCT No.: PCT/JP2013/051467
§ 371 (c)(1),
(2) Date: Jul. 2, 2015

(87) PCT Pub. No.: WO2014/115285
PCT Pub. Date: Jul. 31, 2014

(65) Prior Publication Data
US 2015/0353074 A1    Dec. 10, 2015

(51) Int. Cl.
*B60W 20/00* (2016.01)
*B60W 30/188* (2012.01)
(Continued)

(52) U.S. Cl.
CPC ............... *B60K 6/445* (2013.01); *B60K 6/24* (2013.01); *B60W 10/06* (2013.01); *B60W 10/08* (2013.01);
(Continued)

(58) Field of Classification Search
CPC .. B60W 20/1084; B60W 20/17; B60W 10/08; B60W 20/00; B60W 30/1882;
(Continued)

(56) References Cited

U.S. PATENT DOCUMENTS

2015/0239464 A1*  8/2015  Ando ................... B60W 20/17
                                                       701/22

FOREIGN PATENT DOCUMENTS

CN      104379913 A    2/2015
JP    2005-127185 A    5/2005
(Continued)

*Primary Examiner* — Brian P Sweeney
(74) *Attorney, Agent, or Firm* — ANDREWS KURTH KENYON LLP (57) ABSTRACT

A control apparatus is applied to a hybrid vehicle including an internal combustion engine that is capable of changing over its combustion state between lean combustion and stoichiometric combustion. The control apparatus executes noise suppression control by limiting the operating point of the internal combustion engine to be upon a noise suppression line for lean combustion or to be upon a noise suppression line for stoichiometric combustion, so that the noise generated by a power transmission mechanism is suppressed. When changing over from lean combustion to stoichiometric combustion during execution of noise suppression control, the control apparatus of the present invention changes the air/fuel ratio after changing the operating point of the internal combustion engine from one point to a point that is more toward the lower torque side of the noise suppression line.

6 Claims, 9 Drawing Sheets (51) Int. Cl.
*B60W 10/06* (2006.01)
*B60W 10/08* (2006.01)
*B60K 6/24* (2007.10)
*F02D 41/00* (2006.01)
*B60K 6/445* (2007.10)
*B60W 20/17* (2016.01)
*F02D 41/02* (2006.01)
*F02D 41/30* (2006.01)
*F02P 5/04* (2006.01)
*F02P 5/15* (2006.01)
*F02D 37/02* (2006.01)
*F02D 29/02* (2006.01)
*F02D 41/14* (2006.01)

(52) U.S. Cl.
CPC ............ *B60W 20/00* (2013.01); *B60W 20/17* (2016.01); *B60W 30/1882* (2013.01); *F02D 37/02* (2013.01); *F02D 41/0215* (2013.01); *F02D 41/307* (2013.01); *F02P 5/045* (2013.01); *F02P 5/1504* (2013.01); *B60W 2520/10* (2013.01); *B60W 2710/0622* (2013.01); *B60W 2710/0666* (2013.01); *B60W 2710/08* (2013.01); *F02D 29/02* (2013.01); *F02D 41/0002* (2013.01); *F02D 41/1475* (2013.01); *F02D 2200/025* (2013.01); *F02D 2250/18* (2013.01); *F02D 2250/24* (2013.01); *F02D 2250/26* (2013.01); *Y02T 10/46* (2013.01); *Y02T 10/6239* (2013.01); *Y10S 903/905* (2013.01); *Y10S 903/93* (2013.01)

(58) Field of Classification Search
CPC ......... B60W 10/06; B60W 2710/0666; B60W 2710/08; B60W 2520/10; B60W 2710/0622; F02D 45/00; F02D 41/0002; F02D 41/1475; F02D 2200/025; F02D 29/02; F02D 2250/26; F02D 2250/24; F02D 2250/18; F02D 41/0215; F02D 41/307; F02D 37/02; B60K 6/24; B60K 6/445; Y02T 10/6239; Y02T 10/46; Y10S 903/905; Y10S 903/93; F02P 5/045; F02P 5/1504
USPC .......................................................... 701/22
See application file for complete search history.

(56) References Cited

FOREIGN PATENT DOCUMENTS

| | | |
|---|---|---|
| JP | 2005-163667 A | 6/2005 |
| JP | 2008-201351 A | 9/2008 |

* cited by examiner

CONTROL APPARATUS FOR HYBRID VEHICLE

CROSS-REFERENCE TO RELATED APPLICATION

This is a national phase application based on the PCT International Patent Application No. PCT/JP2013/051467 filed Jan. 24, 2013, the entire contents of which are incorporated herein by reference.

TECHNICAL FIELD

The present invention relates to a control apparatus that is applied to a hybrid vehicle comprising an internal combustion engine that is capable of changing over to both lean combustion and to stoichiometric combustion.

BACKGROUND ART

A control apparatus is per se known that, when the air/fuel ratio of an internal combustion engine is changed toward the rich side from the theoretical air/fuel ratio, absorbs the increase in engine torque that is caused by generation of electricity by a motor-generator (refer to Patent Document #1). This control apparatus increases the amount of fuel supplied to the internal combustion engine while taking account of the response delay in the air amount, so that the air/fuel ratio changes toward the rich side in a short time interval. Apart from the above, Patent Documents #2 and #3 in the Citation List may also be considered to have some relevance to the present invention.

CITATION LIST

Patent Literature

Patent Document #1: JP2005-163667A.
Patent Document #2: JP2005-127185A.
Patent Document #3: JP2008-201351A.

SUMMARY OF INVENTION

Technical Problem

The torques of an internal combustion engine and of a motor-generator that are provided to a hybrid vehicle are outputted to the drive wheels via a power transmission mechanism that includes a gear group. And sometimes it happens that noise such as gear rattle noise or the like is generated by the power transmission mechanism when, due to backlash of the gear group, its gears collide with one another because of transmission of torque fluctuations to the power transmission mechanism. In particular, this type of noise can easily be generated when the motor torque of the motor-generator is in the vicinity of 0 Nm, because a great part of the requested drive torque is being provided by the engine torque of the internal combustion engine. Moreover, there is a tendency for this type of noise to get worse, the higher is the engine torque. In the prior art, in order to deal with this problem, noise suppression control has been performed by specifying a noise worsening region by testing with actual equipment or the like, by setting in advance a noise suppression line that avoids this region, and by limiting the operating point of the internal combustion engine to be upon this noise suppression line.

An internal combustion engine is per se known that, in order to improve the fuel consumption, changes over its combustion state between lean combustion and stoichiometric combustion. When an internal combustion engine of this type is applied to a hybrid vehicle, and when the fuel amount is increased in the process of changing the air/fuel ratio, the engine torque temporarily increases. If, while noise suppression control of the type described above is being executed, the engine torque increases along with change of the air/fuel ratio in this way, then the operating point of the internal combustion engine changes in the direction for the noise to become worse. Although such a temporary increase in engine torque can be absorbed by generation of electricity by the motor-generator, as in the case of the control apparatus of Patent Document #1, there is a limit to this method of coping. Due to this there is a possibility that, when during execution of noise suppression control the combustion state of the internal combustion engine is changed over from lean combustion to stoichiometric combustion, the operating point of the internal combustion engine may enter into the noise worsening region, so that the noise level becomes worse.

Thus, the object of the present invention is to provide a control apparatus for a hybrid vehicle that is capable of preventing noise getting worse as the combustion state of the internal combustion engine is changed over.

Solution to Technical Problem

The control apparatus for a hybrid vehicle according to the present invention is applied to a hybrid vehicle that comprises, as power sources for propulsion, an internal combustion engine that is capable of changing its combustion state while operating between lean combustion and stoichiometric combustion and a motor-generator, and in which engine torque of the internal combustion engine and motor torque of the motor-generator are outputted to a drive wheel via a power transmission mechanism that includes a gear group, and comprises: a combustion mode changeover device configured to change over the combustion state of the internal combustion engine between the lean combustion and the stoichiometric combustion by performing air/fuel ratio change control in which both a fuel amount and an air amount supplied to the internal combustion engine are changed; a noise suppression control device configured to execute noise suppression control in which an operating point of the internal combustion engine, as defined by engine rotational speed and engine torque, is limited to be upon one of noise suppression lines that are set to correspond both to the lean combustion and to the stoichiometric combustion, so that noise generated by the power transmission mechanism is suppressed; and a transient operation control device configured to change over the operating point of the internal combustion engine toward the side of lower torque than the noise suppression line before the combustion mode changeover device executes the air/fuel ratio change control, when the combustion mode changeover device changes over the combustion state of the internal combustion engine from the lean combustion to the stoichiometric combustion during execution of the noise suppression control.

According to this control apparatus, when the combustion state of the internal combustion engine is changed over from lean combustion to stoichiometric combustion during the execution of noise suppression control, the air/fuel ratio is changed after changing the operating point of the internal combustion engine toward the side of lower torque from the noise suppression line. Due to this, along with change of the air/fuel ratio, the starting point of increase of the engine torque is shifted toward the low torque side. Accordingly it is possible to suppress the noise getting worse, since the chance for the operating point of the internal combustion engine to stray over the noise suppression line is reduced.

According to one aspect of the control apparatus of the present invention, it will also be acceptable to arrange for the transient operation control device to change the operating point of the internal combustion engine along an equal power line, so as to be more toward the lower torque side than the noise suppression line. According to this aspect, it is possible to change the operating point towards the low torque side than the noise suppression line, while still maintaining the power output of the internal combustion engine.

In this aspect of the present invention, it would also be acceptable to set an auxiliary line is set at a position that is more toward a low torque high rotational speed side than the noise suppression line set corresponding to a case of the lean combustion; and the transient operation control device may change the operating point of the internal combustion engine to be at a point of intersection of the equal power line and the auxiliary line.

In this case, for example, the auxiliary line may be set in advance in anticipation of the possibility that the operating point of the internal combustion engine may enter into the noise worsening region due to increase of the engine torque accompanying the change of the air/fuel ratio. Due to this, by increasing the engine torque along with change of the air/fuel ratio while taking the point of intersection of the equal power line and the auxiliary line as the starting point, it is possible reliably to avoid entry of the operating point of the internal combustion engine into the noise worsening region. It should be understood that it would also be acceptable to arrange to suppress noise by changing the operating point of the internal combustion engine along the auxiliary line, although not changing the operating point along the equal power line.

According to another aspect of the control apparatus of the present invention, it would also be acceptable, when during execution of the noise suppression control the combustion mode changeover device changes over the combustion state of the internal combustion engine from the stoichiometric combustion to the lean combustion, for the transient operation control device to control the internal combustion engine so that the air/fuel ratio change control is started in a state in which the operating point of the internal combustion engine is positioned upon the noise suppression line. When the combustion state of the internal combustion engine is changed over by the air/fuel ratio control from stoichiometric combustion to lean combustion during execution of noise suppression control, the engine torque decreases temporarily due to the amount of fuel being reduced. Thus, in this aspect of the present invention, since the starting point of reduction of the engine torque is positioned upon the noise suppression line, accordingly the operating point of the internal combustion engine is removed from the noise suppression line in a direction which is advantageous from the point of view of noise. Therefore it is possible to implement changing over of the combustion state while still suppressing noise, even though the engine torque is decreased before the air/fuel ratio change control, as when the combustion state changes over from lean combustion to stoichiometric combustion.

According to yet another aspect of the control apparatus of the present invention, it would also be acceptable to arrange for there to be further included: a motor control device configured to cause the motor-generator to generate electricity so as to absorb change in the engine torque, which has changed in the increase direction due to execution of the air/fuel ratio change control; and an engine control device configured to change an operational parameter of the internal combustion engine so as to reduce the engine torque when it is not possible to absorb all of the change of the engine torque by generation of electricity by the motor-generator. According to this aspect, if it is not possible to absorb all of the change of engine torque by generation of electricity by the motor-generator and excess energy is generated, then this excess energy can be reduced by reducing the engine torque. Due to this, it is possible to suppress shock accompanying change of the air/fuel ratio.

It should be understood that, in this description of the control apparatus of the present invention, the term "stoichiometric combustion" includes, not only combustion in which an air/fuel ratio is targeted that is precisely equal to the theoretical air/fuel ratio, but also combustion in which an air/fuel ratio is targeted that is in the vicinity of the theoretical air/fuel ratio. Moreover, the term "lean combustion" means combustion in which an air/fuel ratio is targeted whose value is greater than that during stoichiometric combustion, in other words combustion in which the targeted air/fuel ratio is toward the lean side.

DESCRIPTION OF EMBODIMENTS

Embodiment #1

Figure 1:
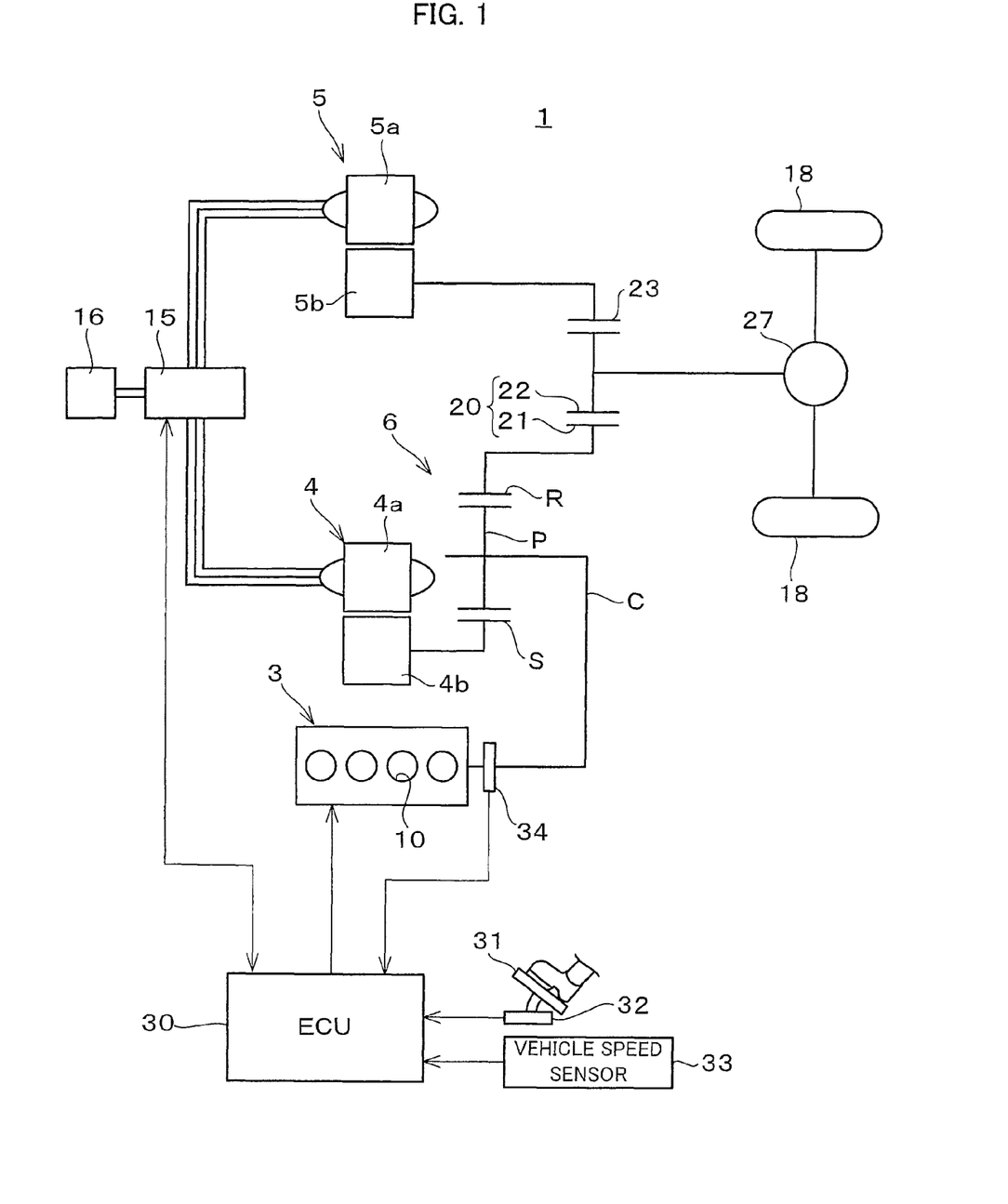
FIG. 1 is a figure showing the overall structure of a vehicle to which a control apparatus according to an embodiment of the present invention is applied.

As shown in FIG. 1, a vehicle 1 is built as a hybrid vehicle in which a plurality of power sources is combined. As power sources for propulsion, the vehicle 1 comprises an internal combustion engine 3 and two motor-generators 4 and 5. The internal combustion engine 3 is built as a spark ignition type internal combustion engine of the four-cylinder in line type, and has four cylinders 10. With the internal combustion engine 3, its combustion state can be changed over between stoichiometric combustion in which the theoretical air/fuel ratio or an air/fuel ratio in the vicinity of the theoretical air/fuel ratio is targeted, and lean combustion in which an air/fuel ratio is targeted that is set toward the lean side from the target air/fuel ratio for the stoichiometric combustion.

The internal combustion engine 3 and the first motor-generator 4 are linked together by a power split mechanism 6. The first motor-generator 4 has a stator 4a and a rotor 4b. The first motor-generator 4, along with functioning as a generator by receiving some of the power of the internal combustion engine 3 that has been split off by the power split mechanism 6 and generating electrical power therefrom, also functions as an electric motor that is driven by AC electrical power. In a similar manner, the second motor-generator 5 has a stator 5a and a rotor 5b, and can function both as an electric motor and as a generator. Both of the motor-generators 4 and 5 are connected to a battery 16 via a motor control device 15. The motor control device 15 converts the electrical power generated by the motor-generators 4 and 5 into DC electrical power which is accumulated in the battery 16, and also converts electrical power from the battery 16 into AC power which is supplied to the motor-generators 4 and 5. The second motor-generator 5 corresponds to the "motor-generator" of the Claims.

The power split mechanism 6 is built as a single pinion type planetary gear mechanism. This power split mechanism 6 comprises a sun gear S that is an externally toothed gear wheel, a ring gear R that is an internally toothed gear wheel and that is disposed so as to be coaxial with the sun gear S, and a planetary carrier C rotatably supporting a pinion P that is meshed with these gears S and R and that can revolve around between them. The engine torque outputted by the internal combustion engine 3 is transmitted to the planetary carrier C of the power split mechanism 6. And the rotor 4b of the first motor-generator 4 is linked to the sun gear S of the power split mechanism 6. Torque outputted from the power split mechanism 6 via the ring gear R is transmitted to an output portion of an output gear train 20 and so on. This output gear train 20 comprises a driving output gear 21 that rotates integrally with the ring gear R of the power split mechanism 6, and a driven output gear 22 that is meshed with the driving output gear 21. The second motor-generator 5 is linked to the driven output gear 22 via a gear 23. The gear 23 rotates integrally with the rotor 5b of the second motor-generator 5. And the torque outputted from the driven output gear 22 is distributed via a differential device 27 to left and right drive wheels 18. Each of the power split mechanism 6, the output gear train 20, and the differential device 27 includes a gear group. Since the torques from the internal combustion engine 3 and from the second motor-generator 5 are outputted to the drive wheels 18 via the power split mechanism 6, the output gear train 20, and the differential device 27, accordingly these devices correspond to the "power transmission mechanism" of the Claims.

Control of the various sections of the vehicle 1 is performed by an electronic control unit 30 (i.e. by an ECU). The ECU 30 performs various types of control for the internal combustion engine 3 and for the motor-generators 4 and 5 and so on. Information of various kinds relating to the vehicle 1 is inputted to the ECU 30. For example, the rotational speeds and the torques of the motor-generators 4 and 5 are inputted to the ECU 30 via the motor control device 15. Moreover, the output signal from an accelerator opening amount sensor 32 which outputs a signal corresponding to the amount by which an accelerator pedal 31 is stepped upon, the output signal from a vehicle speed sensor 33 which outputs a signal corresponding to the speed of the vehicle 1, the output signal from a crank angle sensor 34 which outputs a signal corresponding to the rotational speed of the internal combustion engine 3, and so on, are inputted to the ECU 30. The ECU 30 calculates a requested drive torque which a driver is requesting by referring to the output signal of the accelerator opening amount sensor 32 and to the output signal of the vehicle speed sensor 33, and controls the vehicle 1 while changing over to modes of various types so that the system efficiency becomes optimum in relation to this requested drive torque. For example, in the low load region in which the thermal efficiency of the internal combustion engine 3 drops, an EV mode is selected in which combustion by the internal combustion engine 3 is stopped and the second motor-generator 5 is driven. Moreover, if the amount of torque provided by only the internal combustion engine 3 will not be sufficient, then a hybrid mode is selected in which both the internal combustion engine 3 and also the second motor-generator 5 are employed as drive power sources for propulsion.

When the vehicle 1 is being driven steadily in the hybrid mode, the ECU 30 shifts the operating point of the internal combustion engine 3 so as to keep the thermal efficiency of the internal combustion engine 3 as high as possible. If the requested drive torque for the vehicle 1 cannot be fulfilled only by the engine torque of the internal combustion engine 3, then the amount lacking to make up the requested drive torque is supplemented by the motor torque of the second motor-generator 5. If the greater portion of the requested drive torque is fulfilled by the torque of the internal combustion engine 3, then the motor torque of the second motor-generator 5 becomes a small value in the vicinity of 0 Nm. In this type of state, the mutual pressure force between the gear 23 that is linked to the second motor-generator 5 and the driven output gear 22 becomes weak. Due to this, the result of fluctuations of the rotational speed or of the torque of the internal combustion engine 3 being transmitted to the driven output gear 22 may be that the gear 23 and the driven output gear 22 mutually collide due to backlash between them, so that noise such as gear rattle noise or the like is generated by the power transmission mechanism.

Figure 2:
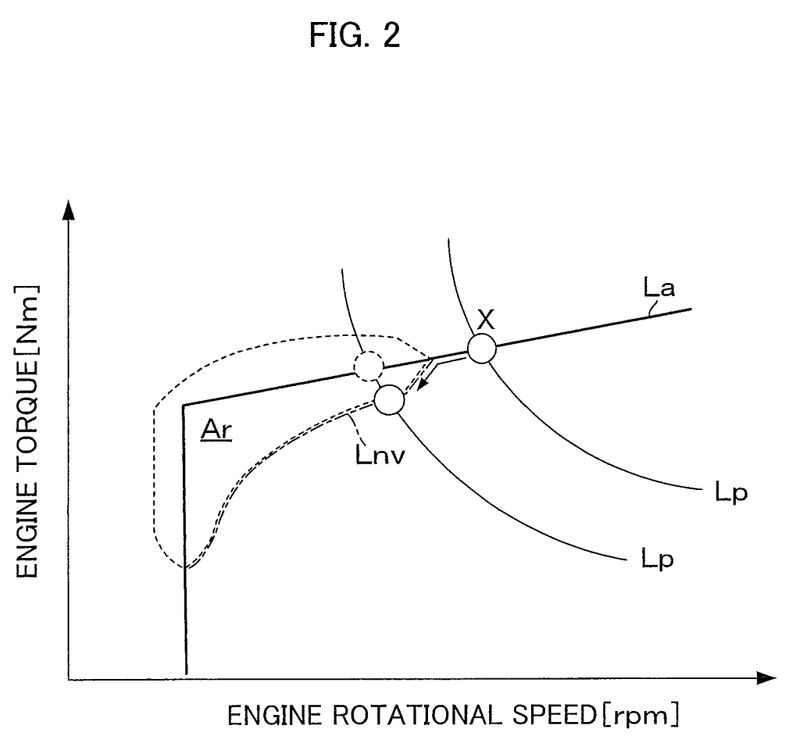
FIG. 2 is a figure for explanation of a summary of noise suppression control.
Figure 3:
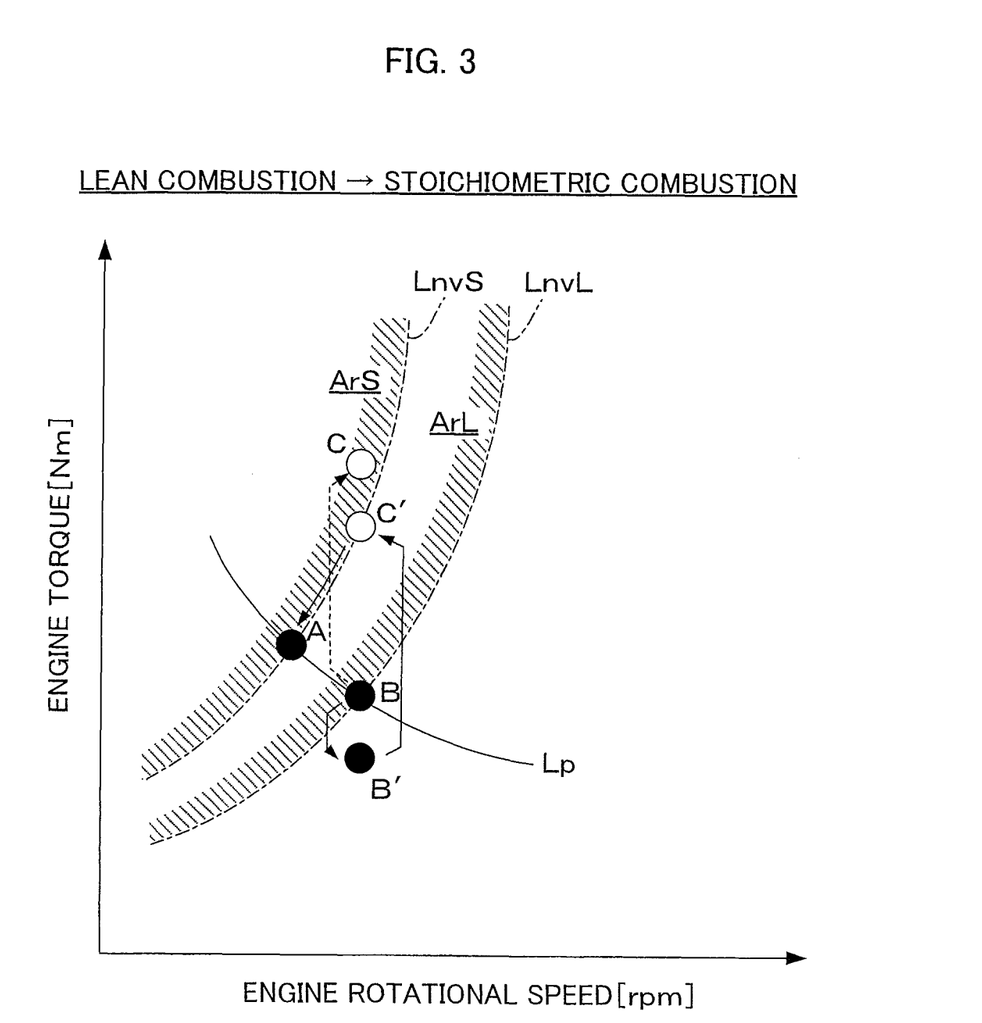
FIG. 3 is a figure showing both change of the operating point when transient operation control according to the present invention is implemented during changeover from lean combustion to stoichiometric combustion while noise suppression control is being executed, and also change of the operating point when a method according to a comparison example is implemented.

The ECU 30 implements noise suppression control in which this type of noise generated by the power transmission mechanism is suppressed. As shown in FIG. 2, a noise worsening region Ar is defined in terms of the engine rotational speed and the engine torque in which noise is generated at a level that exceeds a permitted limit, and moreover a noise suppression line Lnv is set for avoiding the noise worsening region Ar. And the ECU 30 limits the operating point X of the internal combustion engine 3 to be upon the noise suppression line Lnv shown by the dashed line, so that the operating point X of the internal combustion engine 3, which shifts upon a fuel consumption line La that is set on the basis of the thermal efficiency of the internal combustion engine 3, does not enter into the noise worsening region Ar. The noise worsening region Ar and the noise suppression line Lnv are both specified in advance by testing with actual equipment or the like, and information relating to them is stored in the ECU 30. Since the conditions for generation of noise are different depending upon the combustion state of the internal combustion engine 3, accordingly a noise worsening region Ar and a noise suppression line Lnv are set for each of the states of combustion of the internal combustion engine 3. Moreover, a fuel consumption line La is also set for each of these states of combustion. As shown in FIG. 3, a noise suppression line LnvL which corresponds to the lean combustion is set to be more toward the low torque high rotational speed side than a noise suppression line LnvS which corresponds to the stoichiometric combustion. In the case of the lean combustion, a noise worsening region ArL shown by hatching is positioned more toward the high torque low rotational speed side than the noise suppression line LnvL. And, in the case of the stoichiometric combustion, a noise worsening region ArS shown by hatching is positioned more toward the high torque low rotational speed side than the noise suppression line LnvS. The noise worsening region ArL for the lean combustion is wider than the noise worsening region ArS for the stoichiometric combustion, and a part of the noise worsening region ArL overlaps the noise worsening region ArS.

Air/fuel ratio change control that is to be implemented in order to change over the combustion state of the internal combustion engine 3 is implemented according to the requested drive torque by the ECU 30, or according to some other request. In view of the air amount response delay, the changeover from the lean combustion to the stoichiometric combustion is implemented with a temporary increase over a short time interval of the amount of fuel that is supplied to the internal combustion engine 3. Due to this, the engine torque also temporarily increases along with this increase of the fuel amount. As shown in FIG. 3, when during execution of the noise suppression control the combustion state of the internal combustion engine 3 is changed from the lean combustion to the stoichiometric combustion and the operating point changes from the point B to the point A, the engine operating point arrives at the point A after having shifted to the point C, as shown by the arrow sign drawn as a broken line. Since the point C is within the noise worsening region ArS for the stoichiometric combustion, accordingly noise is generated. In the embodiment, as shown by the arrow sign drawn as a solid line, the air/fuel ratio is only changed after the change to the point B' which is toward the low torque side from the point B. Even though the engine torque increases and arrives at the point C' due to this change of the air/fuel ratio, since the starting point of increase of the engine torque is the point B' which is more toward the low torque side than the point B, entering of the point C' into the noise worsening region ArS is avoided. Therefore, it is possible to suppress noise from accompanying change of the air/fuel ratio.

Figure 4:
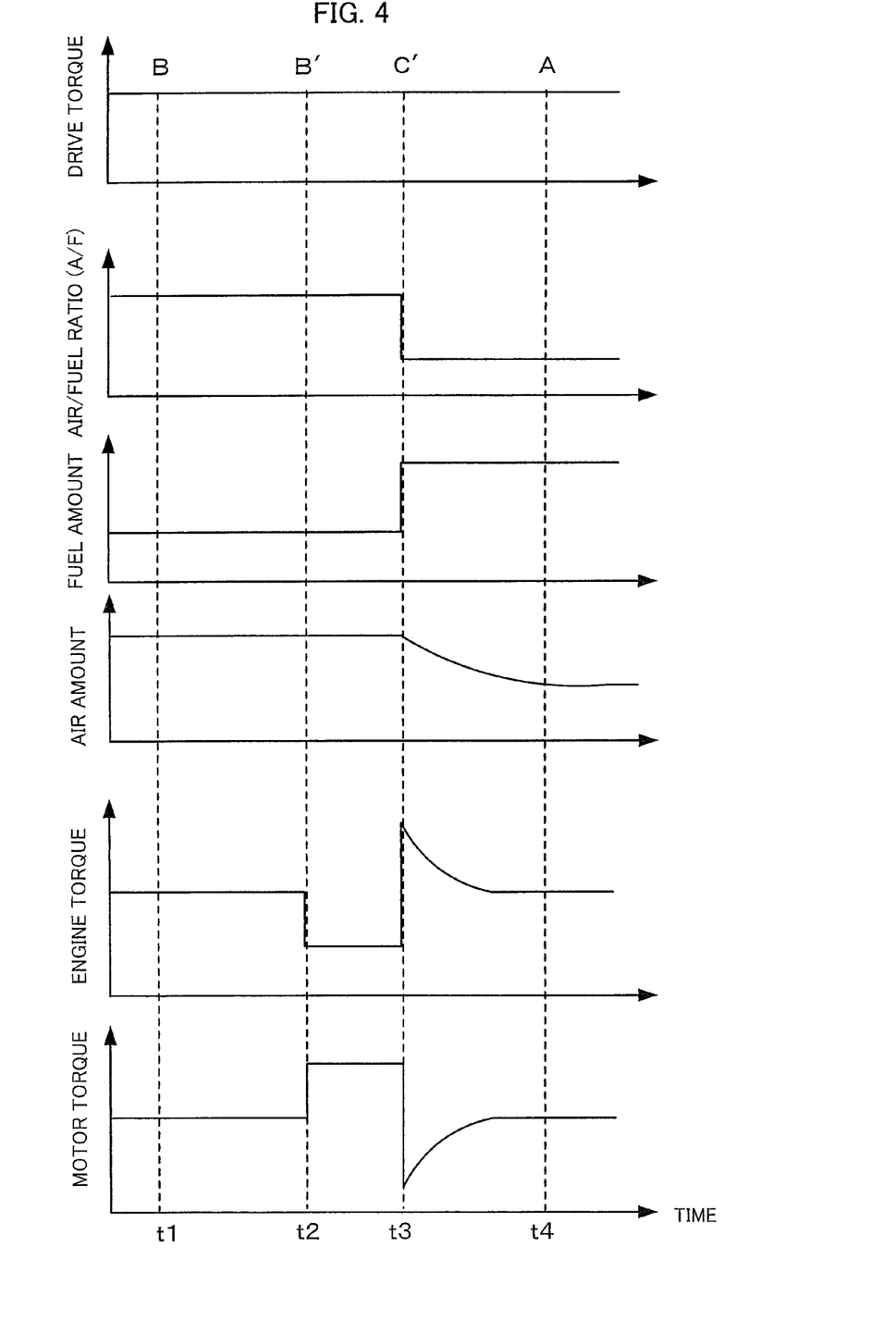
FIG. 4 is a time chart showing the situation when transient operation control is implemented.

The changes over time of various parameters as the operating point of the internal combustion engine 3 changes from the point B to the point A are shown in the time chart of FIG. 4. At the time point t1, since the internal combustion engine 3 is executing the noise suppression control, the operating point is at the point B upon the noise suppression line LnvL. At the time point t2, upon a changeover request from the lean combustion to the stoichiometric combustion, the ECU 30 reduces the engine torque. Due to this, the operating point of the internal combustion engine 3 is changed from the point B to the point B'. As shown in FIG. 3, the point B' is off away from the equal power line Lp toward the low torque side. Accordingly, in order to maintain the drive torque by supplementing the reduction in the engine torque with the motor torque, at the time point t2, the motor torque is increased at the same time as the engine torque decreases. Thereafter, the ECU 30 executes the air/fuel ratio change control at the time point t3. Namely, the ECU 30 increases the amount of fuel supplied to the internal combustion engine 3 and also reduces the air amount. Due to this, the engine torque temporarily increases and the operating point of the internal combustion engine 3 changes from the point B' to the point C'. And at the time point t3 the motor torque is reduced, in order to keep the drive torque the same while cancelling out this increase of the engine torque. It should be understood that, if after increase the engine torque is greater than the drive torque, then this change in the engine torque is absorbed by setting the motor torque to a negative value, in other words by generation of electricity by the second motor-generator 5. The engine torque that has increased at the time point t3 is then gradually reduced by reducing the air amount. Due to this adjustment of the air amount, the operating point of the internal combustion engine 3 arrives at the point A upon the equal power line Lp at the time point t4.

Conversely to the changing over of the combustion state explained above, if during execution of the noise suppression control a change is to be made from the lean combustion to the stoichiometric combustion, then the ECU 30 does not change the operating point of the internal combustion engine 3 before executing the air/fuel ratio control. In view of the air amount response delay, the changeover from the stoichiometric combustion to the lean combustion is implemented with a temporary reduction over a short time interval of the amount of fuel that is supplied to the internal combustion engine 3. Due to this, the engine torque also temporarily decreases along with this reduction of the fuel amount. Accordingly, the engine torque changes in the direction that is advantageous from the point of view of noise.

Figure 5:
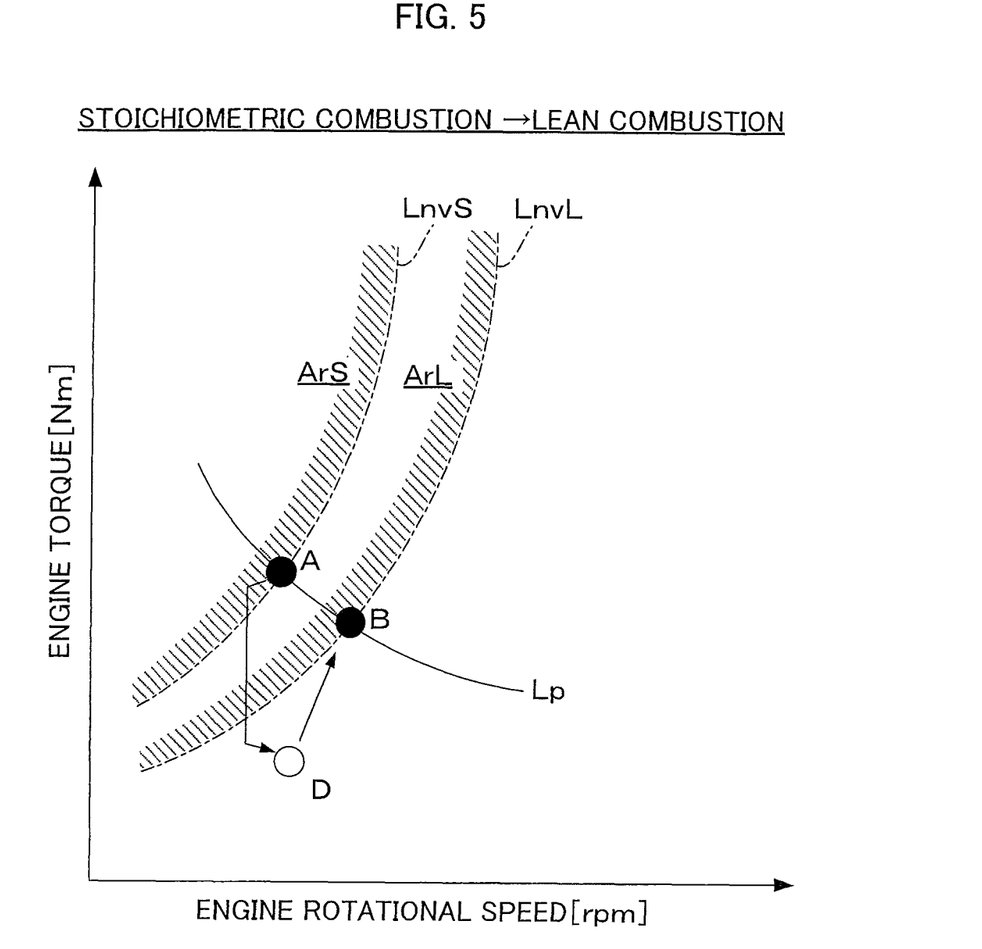
FIG. 5 is a figure showing change of the operating point when transient operation control according to the present invention is implemented during changeover from stoichiometric combustion to lean combustion while noise suppression control is being executed.

For example when, as shown in FIG. 5, during execution of the noise suppression control the combustion state of the internal combustion engine 3 is changed from the lean combustion to the stoichiometric combustion and the operating point is changed from the point A to the point B, then the air/fuel ratio is changed to the point A upon the noise suppression line LnvS without performing change of the operating point as in FIG. 3 and FIG. 4. Due to this, the engine torque temporarily decreases and the operating point changes from the point A to the point D. However the point D is off the noise suppression line LnvL for the lean combustion, in other words is positioned to the low torque high rotational speed side of that line, and is outside the noise worsening region ArL. Due to this, noise is not generated. It should be understood that, in order to compensate for the reduction in the engine torque accompanying the change from the stoichiometric combustion to the lean combustion, the ECU 30 increases the motor torque in synchronism with the change of the air/fuel ratio.

Figure 6:
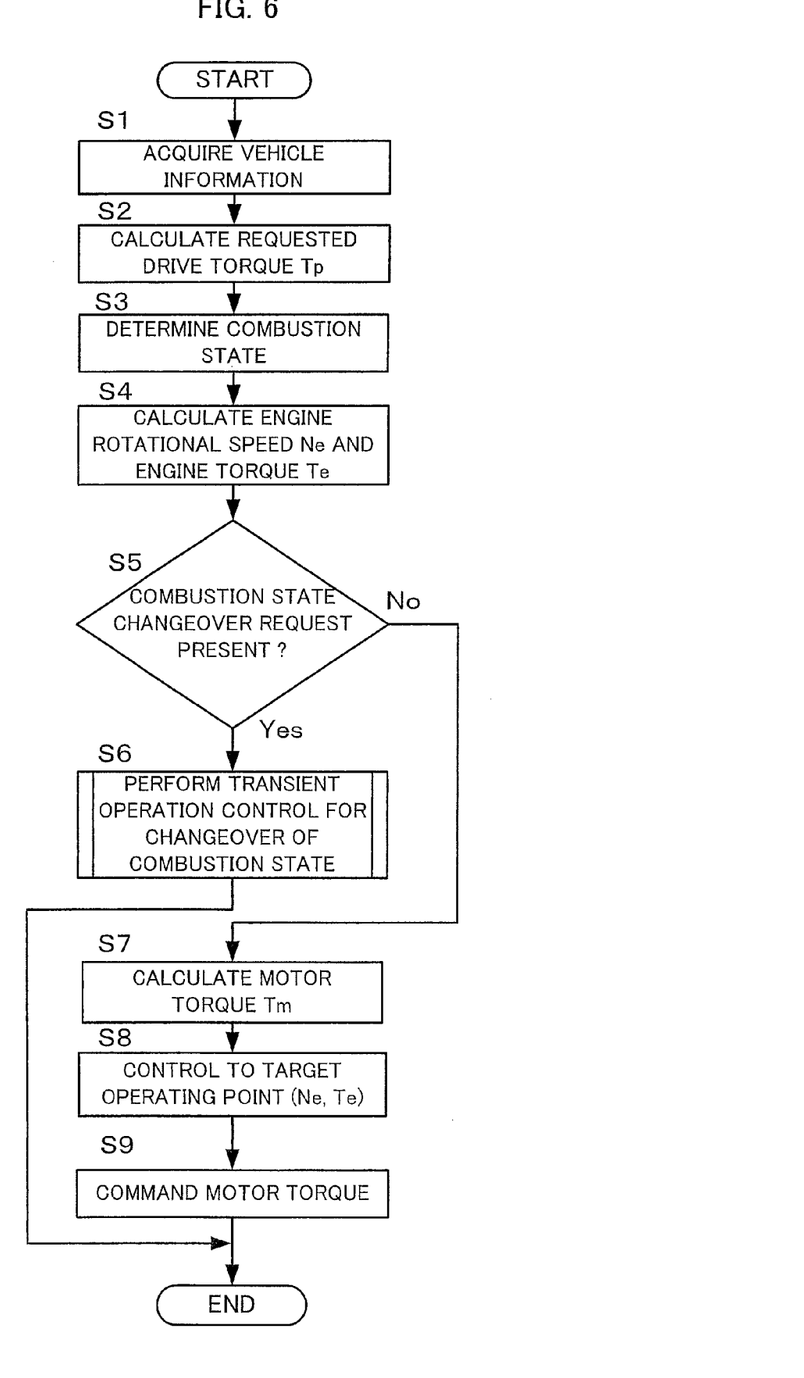
FIG. 6 is a flowchart showing an example of a control routine.
Figure 7:
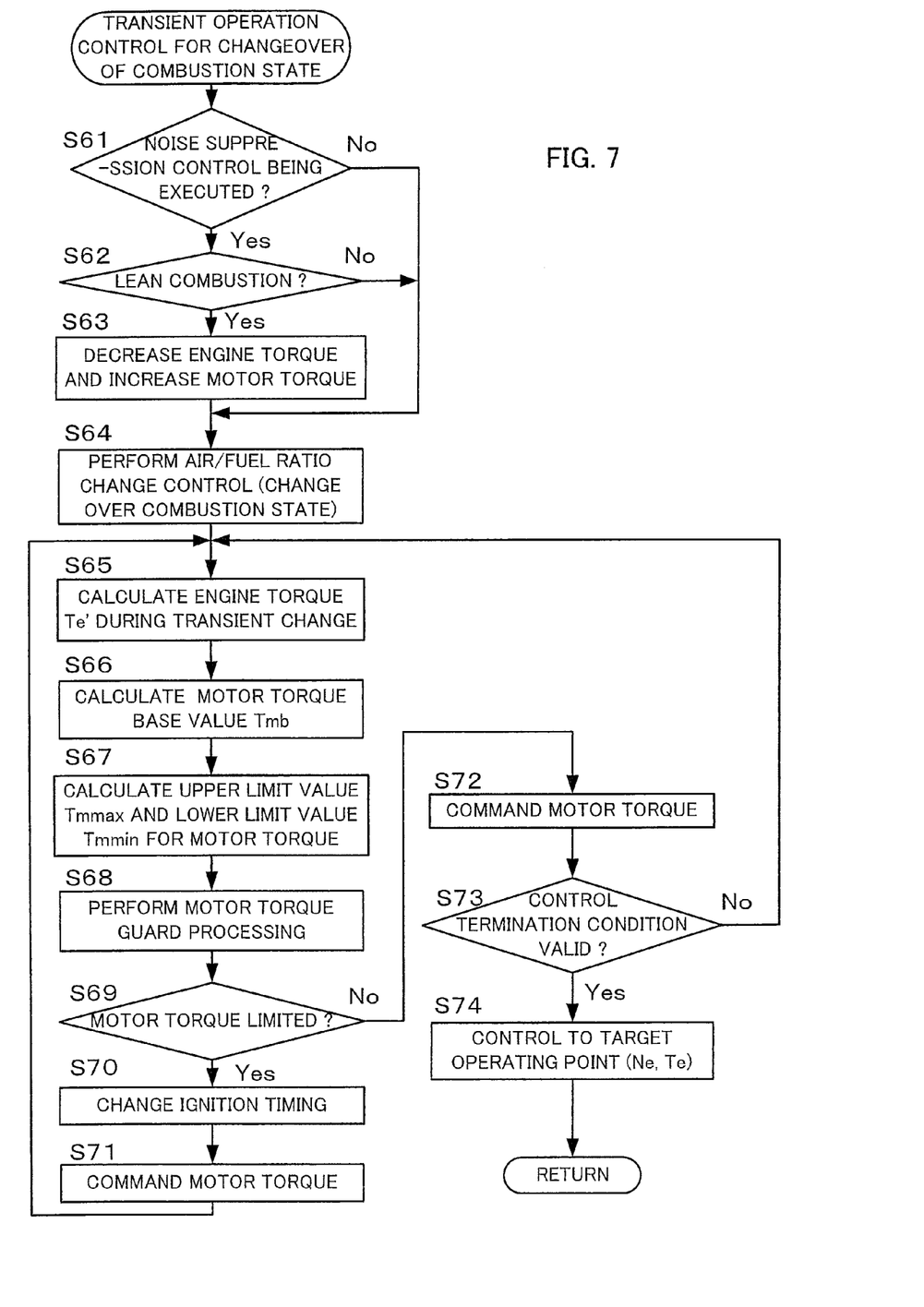
FIG. 7 is a flow chart showing an example of a subroutine of FIG. 6.

FIG. 6 and FIG. 7 show examples of control routines that are executed by the ECU 30. A program for the control routine of FIG. 7 is stored in the ECU 30, and is read out in a timely manner and is repeatedly executed on a predetermined cycle. In a step S1, the ECU 30 acquires vehicle information about the vehicle 1 by referring to the sensors of various types described above and so on. Examples of the vehicle information acquired by the ECU 30 are the accelerator opening amount of the vehicle 1, its speed, the rotational speed of the internal combustion engine 3, and the rotational speeds and the torques of the motor-generators 4 and 5. In a step S2, the ECU 30 calculates a requested drive torque Tp on the basis of the accelerator opening amount and the vehicle speed. The requested drive torque Tp is calculated on the basis of a map that is set in advance. In a step S3, the ECU 30 determines, on the basis of the requested drive torque Tp that has thus been calculated and other vehicle information, whether the combustion state of the internal combustion engine 3 is the lean combustion or is the stoichiometric combustion. When the combustion state has been determined, information prepared in advance relating to the fuel consumption line and the noise suppression line corresponding to this combustion state is read out from the ECU 30.

In a step S4, by obtaining the point of intersection between the line of equal power corresponding to the requested drive torque Tp that was calculated in the step S2 and the fuel consumption line or the noise suppression line, the ECU 30 calculates an operating point of the internal combustion engine 3 that is to become a control target, in other words calculates an engine rotational speed Ne and an engine torque Te. If the intersection of the noise suppression line and the equal power line is calculated as being the operation point of the internal combustion engine 3 that is to be targeted, then the operating point of the internal combustion engine 3 is limited to being upon the noise suppression line. In other words, the noise suppression control is implemented.

In a step S5, the ECU 30 makes a decision as to whether or not a request for changeover of the combustion state is present. Such a changeover request is usually generated from the standpoint of system efficiency. The ECU 30 calculates the system efficiency for the requested drive torque for both cases, i.e. for if the combustion state is maintained and for if it is changed over, and generates a changeover request if the system efficiency would be higher by changing over the combustion state than if the combustion state is kept the same. In some cases a changeover request may be generated due to some cause other than system efficiency. If a request for changeover of the combustion state is present then the flow of control proceeds to a step S6, whereas if no changeover request is present then the flow of control is transferred to a step S7.

FIG. 7 shows the details of the processing in the step S6. In a step S61, the ECU 30 makes a decision as to whether or not the noise suppression control is being executed. Whether or not the noise suppression control is being executed is decided upon by taking, as a reference, whether the current operating point of the internal combustion engine 3 is being limited to the noise suppression line LnvL for the lean combustion or is being limited to the noise suppression line LnvS for the stoichiometric combustion. If the noise suppression control is being executed, then the flow of control proceeds to a step S62. But if the noise suppression control is not being executed, then the flow of control is transferred to a step S64.

In the step S62, the ECU 30 makes a decision as to whether or not the combustion state of the internal combustion engine 3 is the lean combustion. This decision is implemented on the basis of the result of the processing of the step S3 of FIG. 6. If the combustion state is the lean combustion, then the flow of control proceeds to a step S63. But if the combustion state is not the lean combustion, in other words if the combustion state is the stoichiometric combustion, then the step S63 is skipped and the flow of control is transferred to a step S64.

Figure 8:
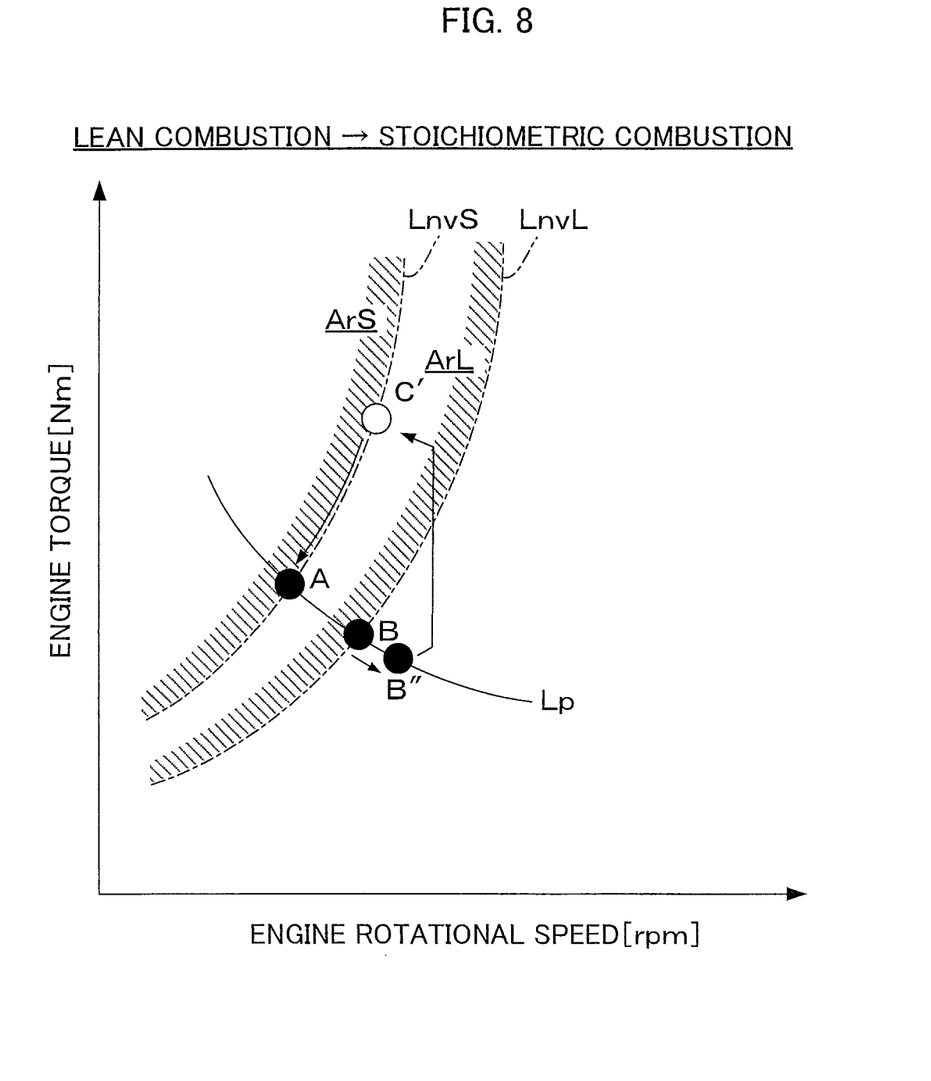
FIG. 8 is a figure showing another method of transient operation control.

In the step S63, the ECU 30 changes the operating point of the internal combustion engine 3 so that the engine torque decreases. Namely, as shown in FIG. 3, the ECU 30 changes the operating point of the internal combustion engine 3 to be more toward the low torque side than the noise suppression line LnvL for the lean combustion. The amount of this change is set according to the operational state of the internal combustion engine 3. It would be possible to change both the engine rotational speed and also the engine torque, or alternatively, as shown in FIG. 3, it would be acceptable only to reduce the engine torque while keeping the engine rotational speed constant within the limit that the operating point of the internal combustion engine 3 is not changing more inside in other words more toward the low rotational speed high torque side than the noise suppression line LnvL. In this step 63, as also shown in FIG. 4, in order to compensate for this type of reduction of engine torque and in order to keep the drive torque constant, the ECU 30 increases the motor torque of the second motor-generator 5 so as to synchronize with the reduction of the engine torque. If both the engine rotational speed and also the engine torque are changed, then, as shown in FIG. 8, then it would also be possible to change along the equal power line Lp the operating point B to an operating point B" that is more toward the high rotational speed low torque side than the noise suppression line LnvL. If the operating point is changed as shown in FIG. 8, then it is possible to change the operating point to be more toward the low torque side than the noise suppression line LnvL while still maintaining the power of the internal combustion engine 3. Thus since, in the FIG. 8 case, the power of the internal combustion engine 3 is maintained even while the engine torque is reduced, accordingly it is possible to reduce or even eliminate the assistance described above that was provided by increasing the motor torque.

In the step S64, the ECU 30 performs the air/fuel ratio change control and changes over the combustion state. If the changeover is to be from the lean combustion to the stoichiometric combustion, then the ECU 30 increases the amount of fuel supplied to the internal combustion engine 3 while reducing its air amount. Moreover, if the changeover is to be from the stoichiometric combustion to the lean combustion, then the ECU 30 reduces the amount of fuel supplied to the internal combustion engine 3 while increasing its air amount. By executing this type of air/fuel ratio control, the air/fuel ratio is changed over during a short time interval.

Along with the increase or reduction of the amount of fuel, the engine torque changes so as to deviate from the target. Thus, in a step S65, the ECU 30 calculates the engine torque Te' during this transient change of engine torque. And an electric motor torque for suppressing this change of the engine torque is calculated in steps S66 through S68. First in the step S66 the ECU 30 calculates an electric motor torque base value Tmb on the basis of the transient engine torque Te' and the requested drive torque Tp. In other words, this motor torque base value Tmb is calculated according to the equation Tmb=Tp−Te'. Next, in a step S67, the ECU 30 calculates both an upper limit value Tmmax and lower limit value Tmmin for the motor torque. This upper limit value Tmmax and lower limit value Tmmin respectively correspond to the input and output limits of the battery 16. In other words, since it is not possible to drive the second motor-generator 5 above the output limit of the battery 16, accordingly the upper limit value Tmmax for motor torque is calculated on the basis of the output limit of the battery 16. Moreover, since it is not possible to make the second motor-generator 5 generate electricity above the input limit of the battery 16, accordingly the lower limit value Tmmin for motor torque is calculated on the basis of the input limit of the battery 16. The input and output limits of the battery 16 are set on the basis of its rating. And next, in a step S68, guard processing is performed for the motor torque. Namely, the motor torque base value Tmb that was calculated in the step S66 is compared with both the upper limit value Tmmax and the lower limit value Tmmin, and the following processing is performed so that the motor torque Tm is not outside these limit values:

If Tmb≤Tmmin, then Tm←Tmmin

If Tmb≥Tmmax, then Tm←Tmmax

In a step S69, the ECU 30 makes a decision as to whether or not the motor torque Tm is limited by the upper limit value Tmmax or by the lower limit value Tmmin. If the motor torque Tm is limited, in other words if the motor torque base value Tmb cannot be used as the motor torque Tm, then the flow of control proceeds to a step S70. If the motor torque Tm is limited, then an excess energy is generated, since, by control of the second motor-generator 5, it is not possible to absorb all of the change of engine torque accompanying the air/fuel ratio change control of the internal combustion engine 3. Thus in the step S70 the ECU 30 corrects the engine torque by changing the ignition timing, which is one of the operational parameters of the internal combustion engine 3. Next, in a step S71, by issuing a command to the motor control device 15 for the motor torque Tm that has been limited, the ECU 30 controls the second motor-generator 5 so as to synchronize with the above correction of the engine torque. And then the flow of control returns to the step S65, and the processing of the steps S65 through S71 is repeated until the limitations upon the motor torque cease to be applied.

For example if, along with changeover of the combustion state, the engine torque of the internal combustion engine 3 has changed in the direction to increase, but all of this change cannot be absorbed by generation of electricity by the second motor-generator 5, then the ECU 30 may change the ignition timing of the internal combustion engine 3 so as to reduce the engine torque. In other words, the ECU 30 may retard or advance the ignition timing in consideration of the current operational state of the internal combustion engine 3. It should be understood that, if the internal combustion engine 3 is of a type in which injection is performed directly into the cylinders, then it would also be possible to reduce the engine torque by changing the timing of fuel injection, which would then serve as the operational parameter. Since the excess energy is reduced by performing this type of decrease control of the engine torque, accordingly it is possible to suppress the shock accompanying change of the air/fuel ratio.

On the other hand, if the motor torque Tm is not limited, in other words if it is possible to employ the motor torque base value Tmb as the motor torque Tm, then the flow of control is transferred to a step S72, and the ECU 30 controls the second motor-generator 5 by issuing a command to the motor control device 15 for this motor torque Tm. Then in a step S73 the ECU 30 makes a decision as to whether or not a control termination condition has become valid, where this control termination condition has been set as a condition for ending this control to absorb the change of engine torque accompanying the change of air/fuel ratio by generation of electricity by the second motor-generator 5. For example, the time rate of changing of engine torque becoming less than a predetermined value may be set as this control termination condition. If the control termination condition has not become valid, then the ECU 30 returns the flow of control to the step S65, and the processing from the step S65 to the step S72 is repeated until the control termination condition becomes valid. But when the control termination condition becomes valid, then in a step S74 the ECU 30 transitions the operating point of the internal combustion engine 3 to the target operating point (Ne, Te). And then this cycle of this control routine terminates, and the flow of control returns to the step S6 of FIG. 6.

As shown in FIG. 6, if there is no request for changeover of the combustion state, then in a step S7 the ECU 30 calculates the motor torque Tm. This processing is the same as the processing of the steps S65 through S68 of FIG. 7. In a step S8, the ECU 30 transitions the operating point of the internal combustion engine 3 to the target operating point (Ne, Te). And, in a step S9, the ECU 30 controls the second motor-generator 5 by issuing a command to the motor control device 15 for this motor torque Tm, so as to synchronize this transition of the operating point of the internal combustion engine 3. Then this cycle of the control routine terminates.

As has been explained above, by the ECU 30 executing the control routines of FIG. 6 and FIG. 7, it is possible to suppress generation of noise by the power transmission mechanism when the combustion state is changed over during execution of the noise suppression control. By executing the step S64 of FIG. 7, the ECU 30 functions as the "combustion mode changeover device" of the Claims; by executing the step S4 of FIG. 6, the ECU 30 functions as the "noise suppression control device" of the Claims; by executing in particular the step S63 of FIG. 7, the ECU 30 functions as the "transient operation control device" of the Claims; by executing the steps S65 through S72 of FIG. 7, the ECU 30 functions as the "motor control device" of the Claims; and, by executing the step S71 of FIG. 7, the ECU 30 functions as the "engine control device" of the Claims.

Embodiment #2

Next, a second embodiment of the present invention will be explained with reference to FIG. 9. This second embodiment is one in which an auxiliary line LnvA is provided at a position that is more toward the low torque high rotational speed side than the noise suppression line LnvL for the lean combustion described above, and this auxiliary line LnvA is used for the transient operational control described above. The other aspects apart from the above are the same as in the first embodiment, and accordingly explanation thereof will be omitted. This auxiliary line LnvA is set in advance in view of the possibility that, due to the increase of the engine torque accompanying change of the air/fuel ratio, the operating point of the internal combustion engine 3 may enter into the noise worsening region ArS for the stoichiometric combustion. To put this in another manner, the auxiliary line LnvA is set in advance so that even if, due to the change of the combustion state, the engine torque increases from being upon the auxiliary line LnvA, it should not enter into the noise worsening region ArS.

Figure 9:
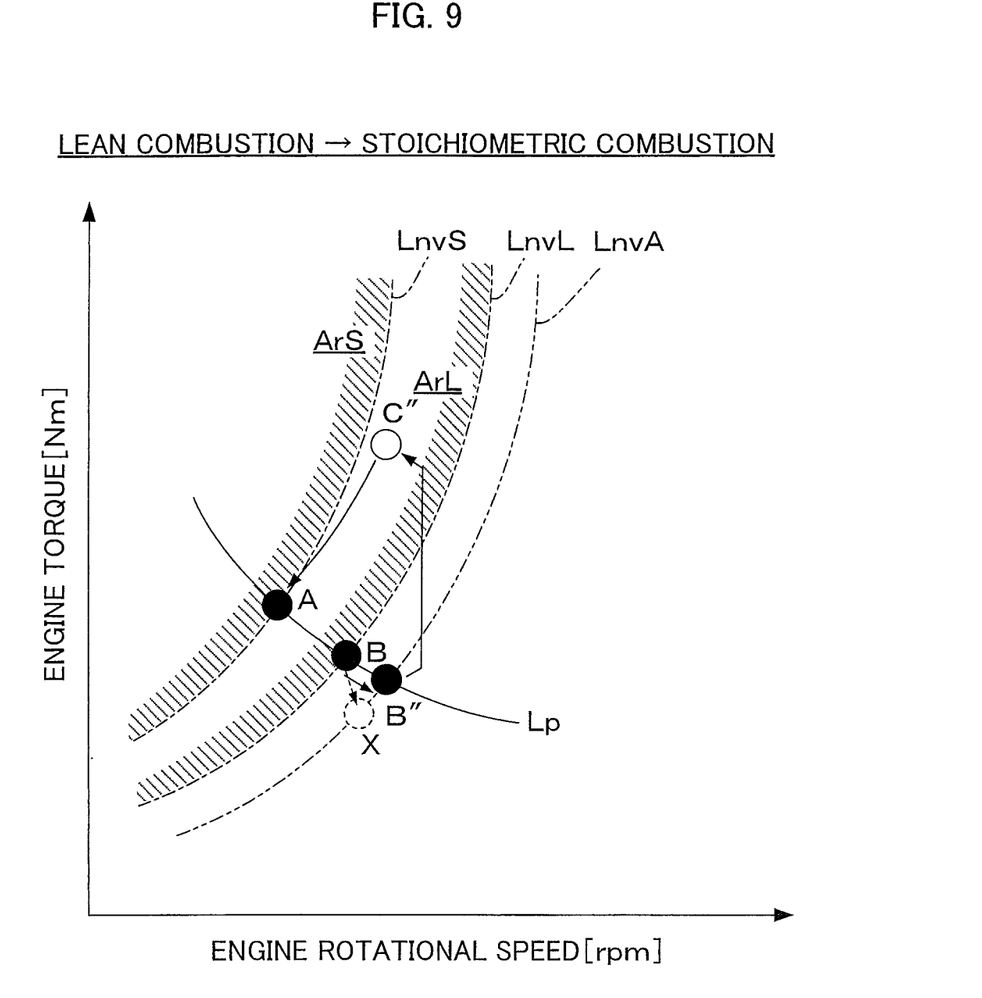
FIG. 9 is a figure showing an example of transient operation control according to a second embodiment.

As shown in FIG. 9, for example if, during execution of the noise suppression control, due to the combustion state of the internal combustion engine 3 changing over from the lean combustion to the stoichiometric combustion, the operating point of the engine changes from the point B to the point A, then, as shown by the arrow sign, the ECU 30 changes the air/fuel ratio after changing the operating point of the internal combustion engine 3 from the point B to the point B", which is the point of intersection of the equal power line Lp and the auxiliary line LnvA, and which is more toward the low torque side than the noise suppression line LnvL. As described above, provided that the starting point of increase of the engine torque is taken upon the auxiliary line LnvA, the operating point of the internal combustion engine 3 does not enter into the noise worsening region ArS. Due to this, entry of the point C" after the engine torque has increased into the noise worsening region ArS is avoided. Accordingly, it is possible to suppress noise accompanying change of the air/fuel ratio. Moreover, with this second embodiment, in a similar manner to the case with the embodiment of FIG. 8, it is possible to maintain the power of the internal combustion engine 3, since the operating point of the internal combustion engine 3 changes toward the low torque side along the equal power line Lp. Accordingly, it is possible to reduce or eliminate the assistance due to increase of the motor torque. It should be understood that, as a variant of this second embodiment, before executing the air/fuel ratio change control, it would also be possible to change the operating point of the internal combustion engine 3 to the point X which, as shown by the arrow sign drawn with the broken line, is not upon the equal power line LP, and which is upon the auxiliary line LnvA, more toward the low torque side than the noise suppression line LnvL. It is possible to suppress noise in this case as well, since it is possible to avoid entry of the operating point of the engine into the noise worsening region ArS for the stoichiometric combustion due to change of the air/fuel ratio.

The present invention is not to be considered as being limited to the embodiments described above; the present invention could be implemented in various different ways within the scope of its gist. And while, in the embodiments described above, the present invention was applied to a hybrid vehicle of a type in which two motor-generators were provided, and one of these motor-generators and the internal combustion engine were linked by a power split mechanism, the subject of application of the present invention is not limited to being a hybrid vehicle of this type. For example, the present invention could also be applied to a hybrid vehicle of a type in which the motor torque of a single motor-generator is transmitted to an output unit to which the engine torque of an internal combustion engine is also outputted.

The invention claimed is:

1. A control apparatus applied to a hybrid vehicle that comprises, as power sources for propulsion, an internal combustion engine that is capable of changing its combustion state while operating between lean combustion and stoichiometric combustion and a motor-generator, and in which engine torque of the internal combustion engine and motor torque of the motor-generator are outputted to a drive wheel via a power transmission mechanism that includes a gear group, comprising:
an electronic control unit (ECU) programmed to:
change over the combustion state of the internal combustion engine between the lean combustion and the stoichiometric combustion by performing air/fuel ratio change control in which both a fuel amount and an air amount supplied to the internal combustion engine are changed;
execute noise suppression control in which an operating point of the internal combustion engine, as defined by engine rotational speed and engine torque, is limited to be upon one of predetermined noise suppression lines that are based upon advanced testing and stored in a program readable by the ECU, and that are set to correspond both to the lean combustion and to the stoichiometric combustion, so that noise generated by the power transmission mechanism is suppressed; and
change over the operating point of the internal combustion engine toward the side of lower torque than the one of the noise suppression lines before the ECU executes the air/fuel ratio change control, when the ECU changes over the combustion state of the internal combustion engine from the lean combustion to the stoichiometric combustion during execution of the noise suppression control.

2. The control apparatus according to claim 1, wherein the ECU changes the operating point of the internal combustion engine along an equal power line that is based upon advanced testing and stored in a program readable by the ECU, so as to be more toward the lower torque side than the one of the noise suppression lines.

3. The control apparatus according to claim 2, wherein:
an auxiliary line that is based upon advanced testing and stored in a program readable by the ECU is set at a position that is more toward a low torque high rotational speed side than the one of the noise suppression lines set corresponding to a case of the lean combustion; and
the ECU changes the operating point of the internal combustion engine to be at a point of intersection of the equal power line and the auxiliary line.

4. The control apparatus according to claim 1, wherein:
an auxiliary line that is based upon advanced testing and stored in a program readable by the ECU is set at a position that is more toward a low torque high rotational speed side than the one of the noise suppression lines set corresponding to a case of the lean combustion; and
the ECU changes the operating point of the internal combustion engine to be upon the auxiliary line.

5. The control apparatus according to claim 1, wherein, when during execution of the noise suppression control the ECU changes over the combustion state of the internal combustion engine from the stoichiometric combustion to the lean combustion, the ECU controls the internal combustion engine so that the air/fuel ratio change control is started in a state in which the operating point of the internal combustion engine is positioned upon the one of the noise suppression lines.

6. The control apparatus according to claim 1, further comprising:
a motor control device configured to cause the motor-generator to generate electricity so as to absorb change in the engine torque, which has changed in the increase direction due to execution of the air/fuel ratio change control; and
an engine control device configured to change an operational parameter of the internal combustion engine so as to reduce the engine torque when it is not possible to absorb all of the change of the engine torque by generation of electricity by the motor-generator.

* * * * *